Aug. 1, 1961        A. SFERLAZZA        2,994,146
TRAVELING SIGNS FOR PUBLIC VEHICLES
Filed Aug. 12, 1959                     2 Sheets-Sheet 1

INVENTOR.
ANTHONY SFERLAZZA
BY
ATTORNEY

Aug. 1, 1961    A. SFERLAZZA    2,994,146
TRAVELING SIGNS FOR PUBLIC VEHICLES
Filed Aug. 12, 1959    2 Sheets-Sheet 2
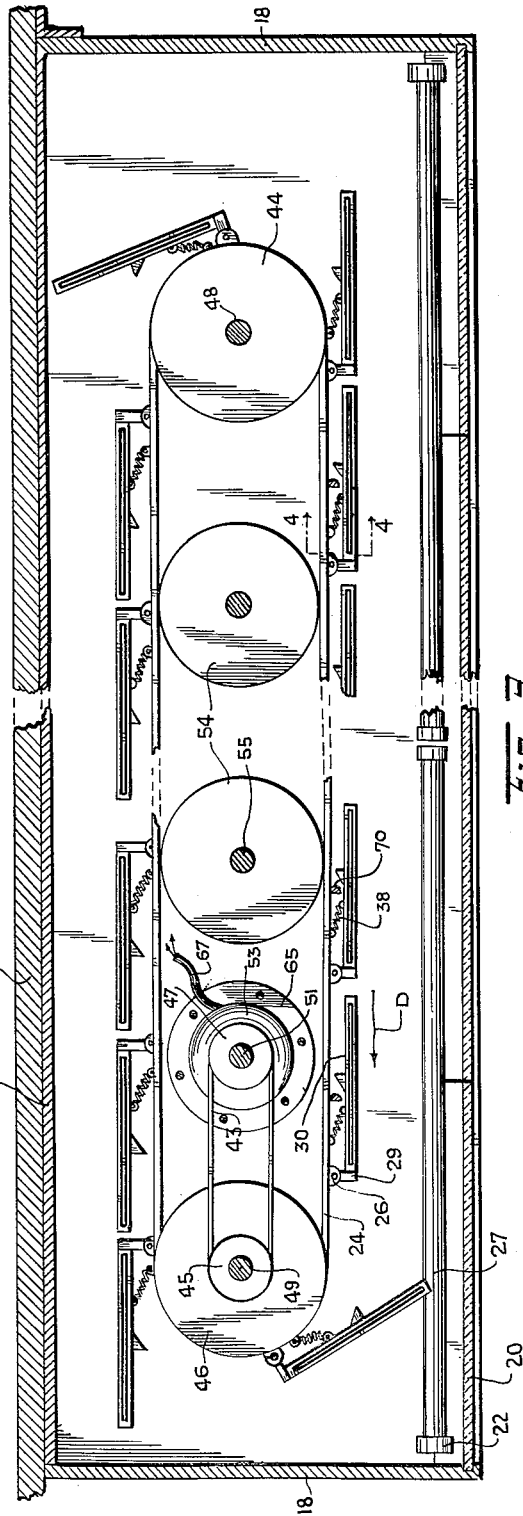
INVENTOR.
ANTHONY SFERLAZZA
BY
ATTORNEY

2,994,146
TRAVELING SIGNS FOR PUBLIC VEHICLES
Anthony Sferlazza, 22—65 37th St., Astoria, N.Y.
Filed Aug. 12, 1959, Ser. No. 833,177
3 Claims. (Cl. 40—30)

This invention concerns a traveling sign adapted for use in public places, vehicles, railroad stations and the like.

According to the invention there is provided an advertising device including an endless belt which carries a plurality of advertising signs thereon. Attention is drawn to the several signs by their movements. The device may be provided with means for jogging or vibrating the signs to vary their regular traveling movement and attract attention to the signs.

It is therefore a principal object of the invention to provide an advertising device including a plurality of signs carried on an endless belt driven by a motor associated with the device.

A further object is to provide rigid frames for the several signs which may pivot around drive pulleys for the endless belt.

A still further object is to provide a device of the character described in which the frames are held by springs in normal coplanar position, and which springs serve to vibrate the frames when they are displaced by cam means.

Another object is to provide a device of the character described which can be mounted as a unit in a vehicle or the like, the unit being provided with a housing and self-contained illumination means.

A further object is to provide a frame structure for a traveling sign adapted for quick insertion and removal of a sign from the frame.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 3 is a plan sectional view on a further enlarged scale taken on line 3—3 of FIG. 2, parts being broken away.

FIG. 4 is a vertical sectional view on a still further enlarged scale of a portion of the device taken on line 4—4 of FIG. 3.

FIG. 5 is an end elevational view of another device according to the invention.

Figure 1:
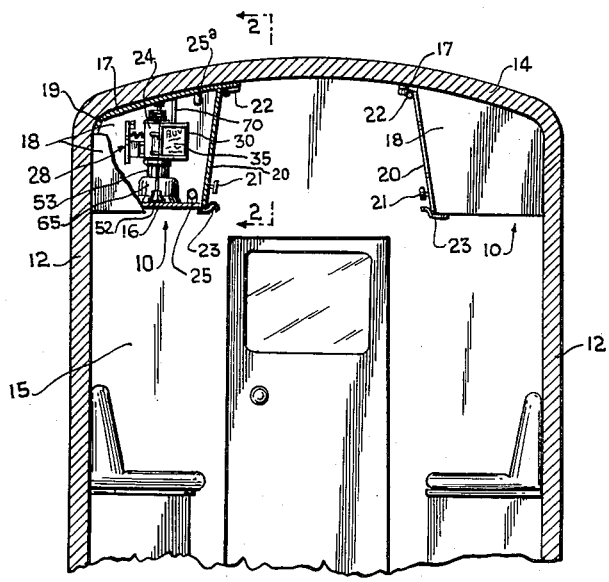
FIG. 1 is an end elevational view of a pair of devices embodying the invention mounted in a vehicle body shown partially in section, a wall of one of the devices being broken partially away to show internal structure.

Referring to FIG. 1 of the drawing, there is shown a pair of the devices generally indicated by numerals 10. These devices are mounted and extend longitudinally along the upper corner intersections of side walls 12 and ceiling 14 of a vehicle body 15. It will be understood, however, that the device or devices can be mounted on any vertical or horizontal support. The manner of mounting shown is a preferred embodiment.

The device has a casing formed with a horizontal bottom wall 16, top wall 17, opposite vertical end walls 18 and back wall 19. The casing thus defined is secured by suitable means to an elevated support such as the wall 12 and ceiling 14. The front of the casing is open and is covered by a plurality of transparent panels or plates 20 arranged in coplanar inclined disposition and secured by hinges 22 to the top wall 17 as shown in FIGS. 1 and 2.

Figure 2:
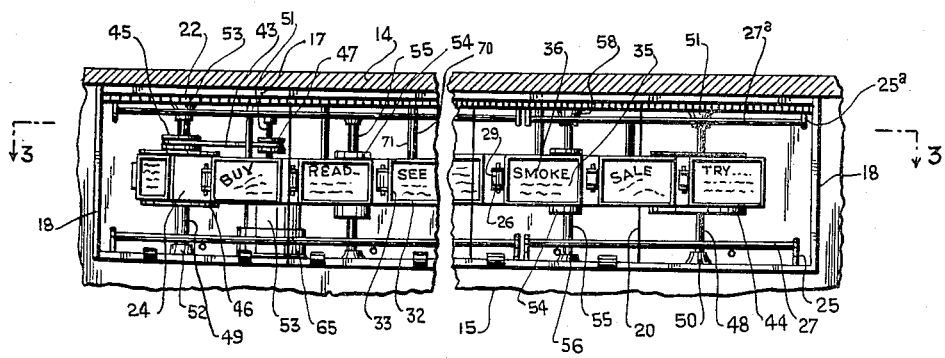
FIG. 2 is a front elevational view of the device on an enlarged scale taken on line 2—2 of FIG. 1, parts being broken away.

Referring now to FIGS. 2–4 where the structural details of the device are shown to best advantage, there is provided an endless flexible belt 24 made of heavy gauge leather, plastic, fabric, or the like. Mounted on the belt are a plurality of spaced hinge brackets 26 which carry pivotal frames 28. The brackets engage pivotal hinges 29 extending outwardly from the ends of rectangular frame plates 30. Each frame plate is integrally formed with channeled portions at bottom edges 32 and end edges 33; see FIGS. 2, 3 and 4. The top edge has a slot 34 adapted to removably receive a rectangular card 35 carrying a desired advertisement 36. Coil springs 38 are secured between eye members 40 and 42 on the frame plates 30 and belt 24, respectively. These springs are tensioned so that normally all frames are disposed parallel to the belt and coplanar with each other no opposite sides of the belt.

The belt is entrained on two pulley rollers 44, 46 at opposite ends. The rollers are provided with shafts 48, 49 journaled in suitable bearings 50, 51 and 52, 53 mounted on the bottom wall 16 and top wall 17, respectively. Disposed between the spaced inner sides of the belt are cylindrical idler rollers 54 having shafts 55 journaled in bearings 56, 58 mounted on bottom wall 16 and top wall 17, respectively. These rollers guide belt 24 and prevent lateral vibration. Roller 46 carries a pulley 45 on which is entrained a drive belt 43 engaged on a pulley 47 carried on the end of a motor shaft 51'. The motor 53' is mounted axially vertical in a bracket 65 secured to the bottom wall 16. The motor is energized via a cable 67 and drives the belt at a predetermined slow speed.

Secured to top wall 17 are a plurality of spaced cam rods 70. Rods 70 are semicylindrical in form. They are oriented with their flat faces 71 facing forwardly in the direction of travel D of the frames 30 between the right roller 44 and left roller 46. Coacting with the cam rods are cam follower members 72. These members are wedge-shaped structures mounted on the backs of the frame plates 30. As the belt carries the frames between the rollers, these cam follower members are obstructed by the cam rods and cause the frames to pivot outwardly on hinges 29 as the cam followers contact and ride past the rods 70. The frames pivot outwardly against the tension in springs 38. As the cam followers pass the cam rods the frames are released and vibrate for a short time. This vibratory movement serves to attract the attention of viewers to the advertisement carried by the frames. The rods 70 can be arranged with uniform spacing so that all frames facing the front of the device are vibrated simultaneously. If the rods are not uniformly spaced, then the several frames may be caused to vibrate at different times.

To replace any advertising card 35, one of the transparent panels or plates 20 is pivoted open on its hinge 22. The card can then be moved upwardly and slipped out of the top of the frame. A new card may then be inserted in the frame.

The panels 20 may be provided with knobs 21. Spring catches 23 may be provided on the housing to engage the bottom edges of the panels to hold them closed. Fluorescent lamp fixtures 25 and 25[a] carrying tubular lamps 27 and 27[a] may be disposed inside at the top and bottom of the housing for illuminating the advertising cards.

There has thus been provided according to the invention a means for changing an advertising sign display attracting attention thereto by displacing the signs from their path of movement on an endless belt. The single axis mounting and pivotal movement of the frames carried by the belt permits them to move around the pulleys as shown in FIG. 3. If the rigid frames were attached to the belt directly, it would not be possible to turn them around the end rollers 44 and 46.

The device is shown in the drawing mounted in a railroad car or bus for one side viewing. If two-side viewing is desired, then the back panel may be made transparent and the device will be suspended from an elevated support. FIG. 5 shows such an arrangement in oppositely inclined panels 20 and 20a both provided for viewing both sides of the device 10a which is shown carried on an overhead support S. Ends 18a will be trapezoidal in shape. When the device is fabricated for two-sided viewing then two rows of cam rods 70 should be provided so that the signs 36 on both sides of the belt will be vibrated.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An advertising display device comprising a housing having a pair of spaced rollers and an extended viewing area with at least one cam member disposed between said rollers, an endless belt having a plurality of spaced hinges and carried by the rollers, motor means for driving across the viewing area, a plurality of rigid displays each pivotally connected to one of the hinges and having a cam follower adapted to engage at least one of the cams to urge the associated display to swing on its hinge, and spring means disposed between each display and said belt for maintaining the display parallel to the belt and for causing the display to vibrate on its hinge when the associated cam follower engages a cam.

2. The advertising display device of claim 1, and having a plurality of spaced cams, each cam follower engaging at least one said cams.

3. The advertising display device of claim 1 in which each hinge is connected at one edge of the display supported thereby.

References Cited in the file of this patent

UNITED STATES PATENTS

| | | |
|---|---|---|
| 966,083 | Cochran et al. | Aug. 2, 1910 |
| 1,078,742 | Mevis | Nov. 18, 1913 |
| 2,649,798 | Bustamante | Aug. 25, 1953 |
| 2,720,137 | Musebeck et al. | Oct. 11, 1955 |